United States Patent [19]
Mörchen

[11] Patent Number: 5,983,648
[45] Date of Patent: Nov. 16, 1999

[54] METHOD AND INSTALLATION FOR PREPARING THE SHIPMENT OF FROZEN GOODS

[76] Inventor: Wolfgang Mörchen, Kriemhildstrasse 18, D-90513 Zirndorf, Germany

[21] Appl. No.: 08/894,119

[22] PCT Filed: Oct. 31, 1996

[86] PCT No.: PCT/EP96/04752

§ 371 Date: Aug. 12, 1997

§ 102(e) Date: Aug. 12, 1997

[87] PCT Pub. No.: WO98/06646

PCT Pub. Date: Feb. 19, 1998

[30] Foreign Application Priority Data

Aug. 13, 1996 [AT] Austria .......................................... 1456

[51] Int. Cl.[6] .................................................. F25D 13/06
[52] U.S. Cl. ................................... 62/63; 62/237; 62/337
[58] Field of Search ................................ 62/237, 337, 63

[56] References Cited

U.S. PATENT DOCUMENTS

| | | | |
|---|---|---|---|
| 3,228,205 | 1/1966 | Franklin | 62/237 |
| 3,545,223 | 12/1970 | Elland | 62/237 |
| 3,621,672 | 11/1971 | Meredith | 62/237 |
| 4,034,572 | 7/1977 | Morris et al. | 62/237 |
| 4,425,768 | 1/1984 | Burns | 62/237 |
| 5,125,240 | 6/1992 | Knippscheer et al. | 62/337 |
| 5,176,202 | 1/1993 | Richard | 62/337 |

*Primary Examiner*—Ronald Capossela
*Attorney, Agent, or Firm*—Hale and Dorr LLP

[57] ABSTRACT

A method and installation for the selective assembly of frozen items (19) for despatch on the basis of intended destinations. From a full pallet all items are transposed into storage tubs (1) which are stored in a frozen tub store (5, 6). From the tub store (5, 6) the storage tubs (1) are passed to a selective assembly zone (7) in which the items (19) can be removed outside the frozen area.

14 Claims, 2 Drawing Sheets

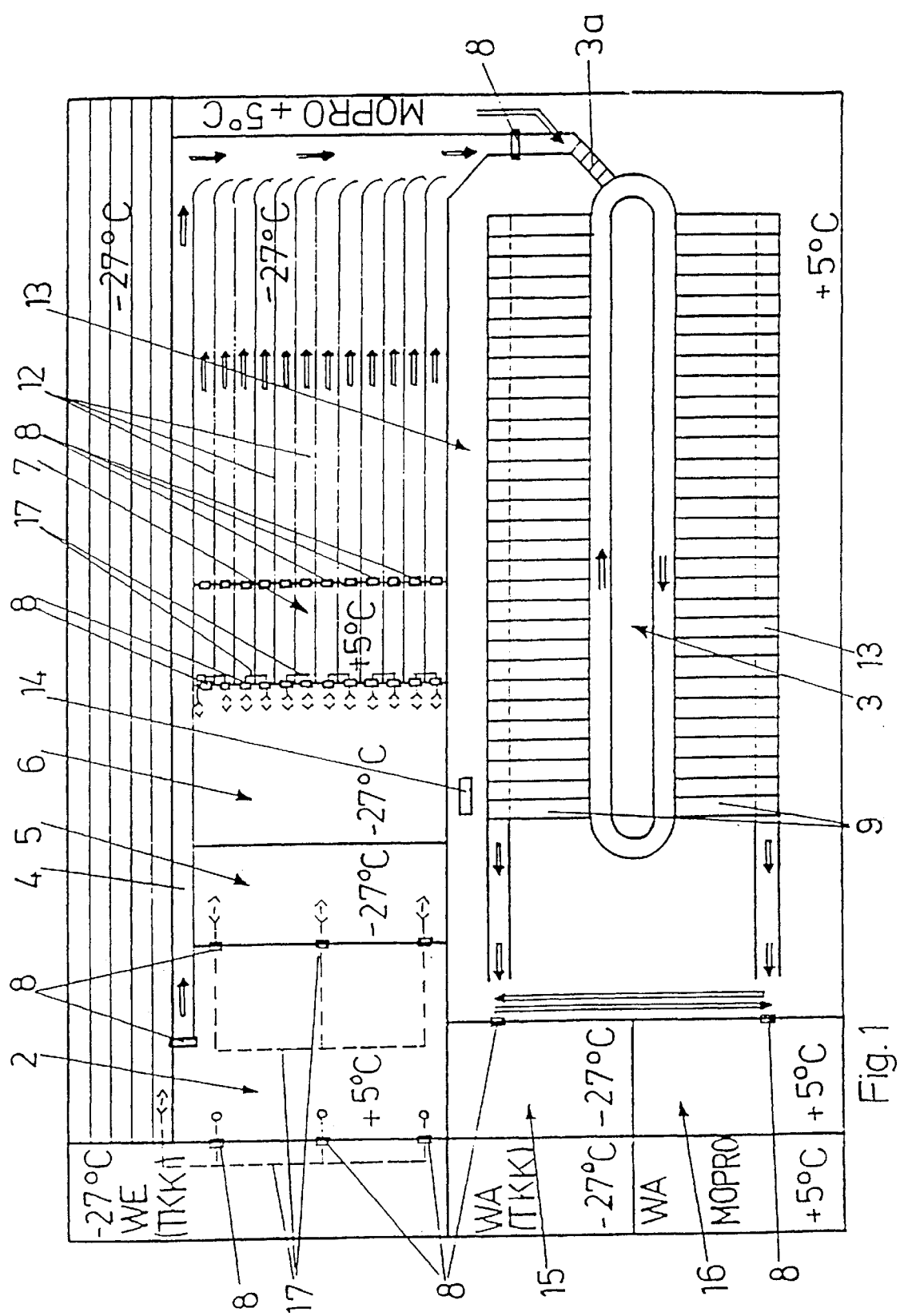

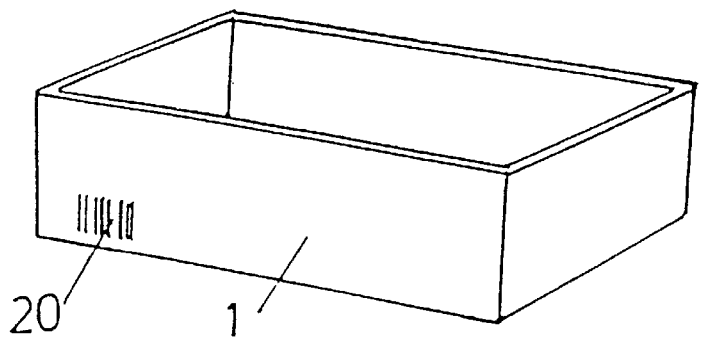
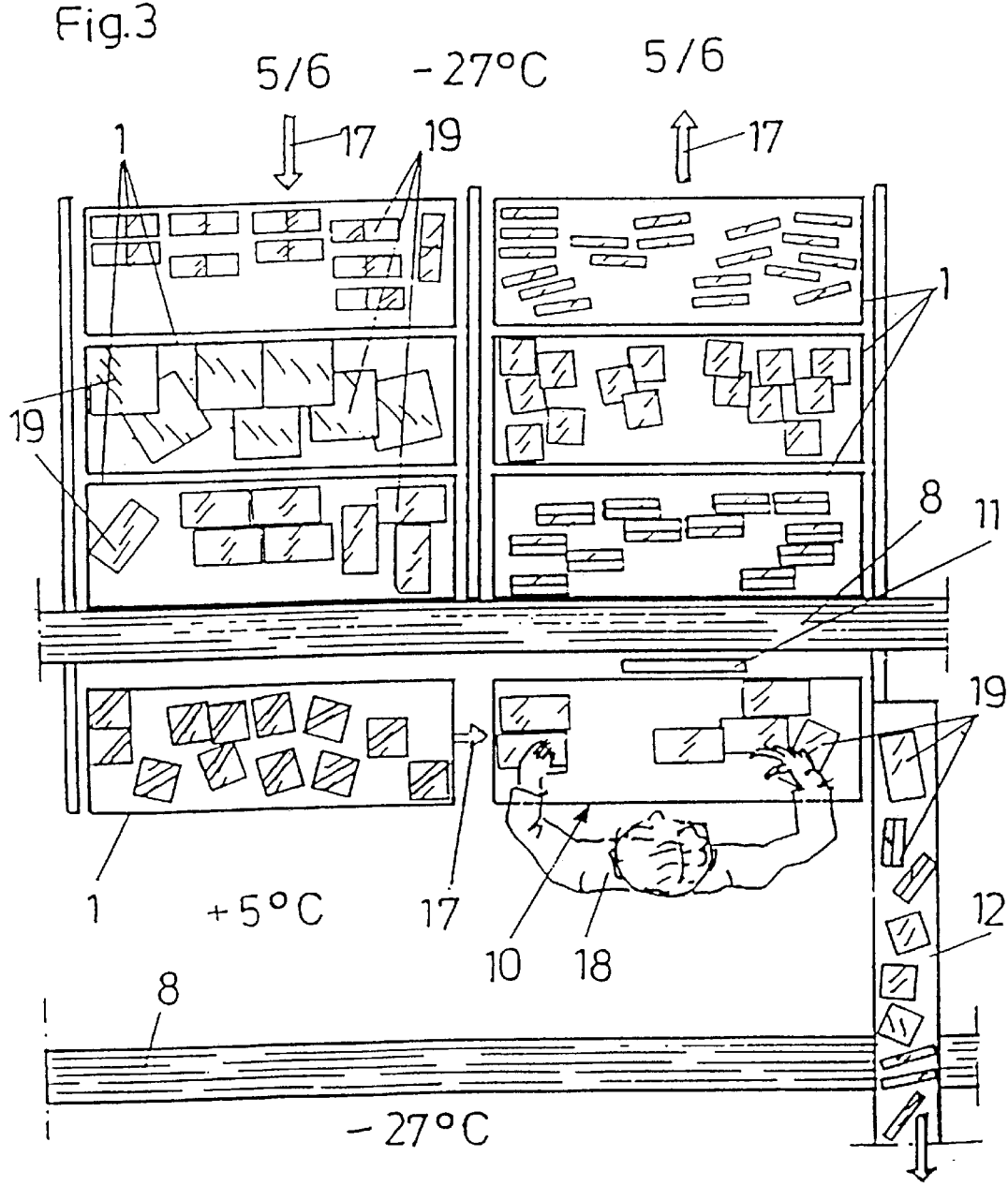

METHOD AND INSTALLATION FOR PREPARING THE SHIPMENT OF FROZEN GOODS

The invention concerns a method for selectively assembling for despatch on the basis of intended destinations frozen items which outside a frozen full pallet store are taken from the full pallets.

The invention also concerns an installation for selectively assembling frozen items for despatch on the basis of intended destinations comprising a frozen full pallet store and a conveyor device for conveying the full pallets between the full pallet store and a depalleting zone outside the frozen full pallet store.

It is already known from German laid-open application (DE-OS) No 40 21 665 to effect the selective assembly of items for despatch thereof on the basis of intended destinations, starting from full pallets, outside a frozen trough or tub store. In that procedure the items are sorted in a frozen sorting buffer and are then assembled again outside the frozen area to give mixed or hybrid pallets.

The object of the present invention is to provide an improved method and an improved installation for selectively assembling frozen items, with which faster selective assembly of frozen items for despatch on the basis of intended destinations is possible, wherein the frozen chain is not interrupted and nonetheless the working places are outside the frozen area.

In accordance with the method of the invention it is provided that in a depalleting zone outside the frozen full pallet store all items of a full pallet are transposed into storage troughs or tubs, whereupon the storage troughs or tubs are passed to a frozen trough or tub store, and that in a selective assembly zone outside the frozen trough or tub store items are taken from the troughs or tubs which are passed into the selective assembly zone and then the storage troughs or tubs are passed to the trough or tub store again. The installation according to the invention is characterised by a frozen trough or tub store for the storage of storage troughs or tubs, a selective assembly zone outside the frozen trough or tub store, and conveyor devices for conveying the storage troughs or tubs from the trough or tub store to the depalleting zone and back and from the trough or tub store to the selective assembly zone and back.

That affords the following advantages:

The storage tubs can be moved more quickly than full pallets and mixed or hybrid pallets, for example it is possible for the storage tubs to be moved at 2 m/s. In that way it is possible to reduce the residence time in the selective assembly zone which is outside the frozen area, and thus to eliminate the risk of an interruption in the frozen chain.

The high acceleration capability of the storage tubs which are to be loaded at most right up to the edge is to be evaluated as positive in the same sense as—unlike the situation with the basically open pallets—no package articles (items) can fall out of the storage tub. The ratio of maximum possible accelerations between storage tubs on the one hand and pallets on the other hand is 10:1.

The possibility of rapid weight checking of the easily handleable storage tubs is also advantageous.

Further advantages and features of the invention will be described in greater detail with reference to the specific description hereinafter. In the drawing:

FIG. 1 is a diagrammatic plan view of an installation according to the invention for carrying out the method according to the invention, FIG. 2 shows an embodiment of a storage trough or tub according to the invention, and FIG. 3 is a diagrammatic plan view of a selective assembly place in the selective assembly zone.

The item coming in from the production factory is delivered at an assumed core temperature of −27° C. in refrigerated goods vehicles (item entry WE (TKK)). The docking process follows the procedure which is usual in modern installations, with the item being shielded from atmospheric influences. The palleted item is put at a temperature of −27° C. on to automated conveyor installations and put into store for the purposes of identification by way of the so-called I-point disposed upstream of the high-shelf store. Only full pallets are stored in the high-shelf store (TKK-HRL), no broaching thereof.

For selective assembly of items for despatch on the basis of intended destinations, in respect of small and medium amounts of items, as measured according to article and order unit, in accordance with the invention picking is effected from trough-shaped or tub-shaped containers (storage troughs or tubs) which are automatically made available for a short time to the selective assembly operator at his work place (see below). The tubs 1 can advantageously be of a parallelepipedic shape, as is shown in FIG. 2. In order always to have sufficient goods per article ready in the tubs, at the item entry, of each article which has not been depalleted in an adequate amount, an entire pallet is broken down and distributed into a plurality of tubs. That is effected in the so-called depalleting zone 2 in which pallets for large batches which are taken past the storage tub and directly fed to the loading installation of the selective assembly sorter 3 (conveyor path 4) are also depalleted.

The residence time of the frozen food in the depalleting zone 2 which is temperature-controlled at +5° C. is to be established in the time range of some 10 seconds before it is passed by way of draw-off belts in storage tubs 1 or in the form of a group of individual package items by way of air-locks into the frozen food area at −27° C. Quality impairment is avoided thereby.

The depalleters operate on a piece rate basis or an incentive-payment basis. To increase output, ergonomically optimized, that is to say height-adjustable, pallet-receiving places may be fitted into the feeding conveyor technology.

The storage tubs 1 which are filled with the frozen food (LxBxH: for example about 800×600×400 mm) are automatically put into and taken out of storage in their own high-shelf store (tub store 5). The storage tubs are provided on 'Life' with machine-readable labels so that at the tub-I-point there can be a 'marriage' of storage tub, article and number of items.

At least one storage tub per article is fed directly, by-passing the tub store, to a separate tub buffer 6 (see below) which is disposed directly in front of the selective assembly zone 7. With a number of articles of about 3000 which is usual in such a system, of the order of magnitude of 10,000 to 20,000 storage tubs must be stored.

Removal is controlled by way of the stock management computer on the basis of the fifo principle (first in, first out).

At least one storage tub per article is to be stored in the tub buffer 6, that is to say around 3000 storage tubs, in accordance with the foregoing information. The output of the tub buffer is to be such that per order block or unit of about 400 trolley containers, during the block time of for example 30 minutes, about 1500 storage tubs (=articles) can be passed into the zone 7, each for a few seconds. That compressed removal presupposes a smoothing effect using DP-methods, which is possible as the order structure is known several hours in advance so that in spite of the priorization of deadline and remote-distance orders, the above-mentioned minimization of the tub movements can be achieved.

The orders are processed in units or blocks of some hundred trucks or trolleys (at about 50 package items reference volume) which in terms of selective assembly procedure can be run together without the block pauses which are often usual. The elimination of pauses or breaks is achieved by the installation of heat-insulated storage chutes 9 at the sorter 3, of double length, which are divided by way of remote-actuated lowerable flaps in a ratio of 50:50, and by buffer zones in the feeding conveyor assembly.

Depending on the respective unit or block size the processing time is dependent on the number of items in the unit or block, the sorting machine output and the number of storage chutes. It is composed of the pure sorting time and the partially overlapped packing time. The order of magnitude, depending on the requirement profile involved, is to be estimated at between 30 and 90 minutes.

In preparation of a unit or block in the computer, in regard to all articles addressed a check is made to ascertain whether one or more full pallets have to be broken up. If yes, that quantity of items, as described above, after the depalleting operation, is passed by way of the path 4 directly to the sorter 3 which feeds same to the storage chutes 9. All amounts of items which make up less than a full pallet are taken from the above-described storage tubs 1. The latter are passed for a few 10 seconds individually through an air-lock to the selective assembly work place 7 (+5° C.) (from the tub buffer 6).

If necessary the operator sticks machine-readable labels on to the items in order to ensure fully automatic implementation, more especially in the sense of order and revolution association, in the subsequent conveyor procedure.

The selective assembly place (diagrammatic view in FIG. 3) in the zone 7 serves for preparation of the storage tubs 1, such that they are convenient to grip. For that purpose the storage tub 1 is automatically inclined forwardly, insofar as it is in front of the selective assembly place. The conveyor system is based on a fully automatically operating weighing device 10 (accuracy about ±50 g) which by way of a process computer makes it possible to check the correctness of the amount taken, insofar as initial weight A, desired or target removal amount M and final weight E are correlated in relation to the article weight G. If the check result is correct the tub is immediately returned by one-way circulation without intervention on the part of the worker into the tub store which is temperature-controlled at −27° C. Empty tubs are pulled out there.

The desired or target removal amount is displayed to the selective assembly operator 18 on a computer-controlled display 11. That also serves for the display of any incorrectly taken amounts in order possibly to cause the person 18 additionally to remove −x items or to put +y items back into the tub from the removal belt.

The item 19 which has been selectively assembled and if necessary labelled is put on to an intermittently operating withdrawal conveyor belt 12 which is controlled by the same check pulse as the tub discharge mechanism. In general the frozen food is conveyed after a few seconds through an air-lock 8 into a storage chamber (−27° C.) from which the automatically operating charging lock stations 3a of the sorter or sorters 3 are loaded.

Mechanically operating sorters 3 are used to distribute individual items to given storage chutes 9 which are predetermined by the control computer. Depending on the system size between some dozen and a few hundred chutes are required per sorter.

In the case of single-purpose frozen food installations the sorter or sorters 3 operate at an ambient temperature of −27° C. That case does not need to be further investigated as here there is no fear of a possible interruption in the frozen chain. As however major wholesalers are selling both frozen food (identified as TKK) and also dairy products (identified as MOPRP), common use of the installation for both groups of products is desirable.

In a mixed or hybrid mode of operation sorters 3 and storage chutes 9 which are flange-mounted thereto must be operated at am ambient temperature of +5° C. as dairy products would not in any way be capable of surviving a residence time of several ten minutes in a temperature range of −27° C. without aqueous or albumin-bearing constituents being permanently damaged.

The items stored in the storage chutes 9 are then put by a person into small standardized trolleys 14 and either moved into the storage means 15 for frozen food or the storage means 16 for dairy products. From there the trolleys 14 provided with the items to be delivered can then be moved into the item discharge (WA) for frozen food or dairy products. That can involve direct loading of a transport vehicle or firstly an assembly procedure and the result is then jointly loaded into a transport vehicle.

Manufacturers are increasingly—but unfortunately not yet universally—identifying their articles by means of bar code labels, predominantly with so-called EAN-codes. Therefore at I-points and branches in logistic systems those items of information can be read, set against computer-based reference or target locations of demands and used for procedure control or permanent stock control. As, where those bar code identifications are still absent at the present time, suitable labels are applied by the selective assembly operators in the frozen-food and dairy-product areas, a general control system for functioning of the invention may be assumed to be involved.

All procedures and items of information related to articles and numbers of items are to be checked for very substantial freedom from error by the use of modern weighing technology, that is to say by the use of electronic weighing machines which can even weigh moving loading accessories. That however presupposes accurate observation of the article origin dates in conjunction with the frozen food manufacturers.

The working and storage zones which are controlled at different temperatures at −27° C. and +5° C. are separated from each other by air-locks 8 in such a way that a slight increased pressure of about 1 mm water column is maintained in the working region at +5° C. in which people are active so that although 'warm air' can penetrate into the frozen area, cold air cannot pass into the working area.

In that respect, in regard to the design of the air-curtain drying installation, attention is to be directed to adequate dimensioning and a desirable configuration in order to prevent icing in the frozen area (the problem is already technically satisfactorily solved in existing installations which operate without a differential pressure).

The structure of the conveyor devices 17 is not shown in greater detail as it is clear to the man skilled in the art how pallets or storage tubs can be advantageously conveyed, according to the circumstances involved. The structure of the individual stores also corresponds in principle to the state of the art and is therefore not shown in greater detail herein. The essential aspect of the invention is repackaging of a full pallet in storage tubs which after intermediate storage are fed to a selective assembly zone which is outside the frozen area.

I claim:

1. A method of selectively assembling for dispatch on the basis of intended destinations frozen items which are taken from a full pallet after the full pallet is removed from a frozen full pallet storage facility, comprising the steps of:

transposing all items of a full pallet of items into storage tubs in a depalleting zone outside the frozen full pallet storage facility, passing the storage tubs to a frozen tub storage facility, taking items from said storage tubs when said storage tubs are passed into a selective assembly zone outside the frozen tub storage facility, and returning said storage tubs to the frozen tub storage facility.

2. The method as set forth in claim 1 further comprising the steps of feeding items removed from said storage tubs in the selective assembly zone to at least one frozen area.

3. The method as set forth in claim 1, further comprising the steps of weighing the storage tubs in the selective assembly zone and determining on the basis of the weighing result whether the correct number of items has been taken from said storage tub.

4. An installation for selectively assembling frozen items for dispatch on the basis of intended destinations comprising:

a frozen full pallet storage facility, a depalleting zone outside the frozen full pallet storage facility, a conveyor for conveying full pallets between the full pallet storage facility and said depalleting zone, a frozen tub storage facility for the storage of storage tubs, a selective assembly zone outside the frozen tub storage facility, and a tub conveyor for conveying the storage tubs from the tub storage facility to the depalleting zone and back and from the tub storage facility to the selective assembly zone and back.

5. An installation as set forth in claim 4 wherein the frozen storage facility is at a temperature of below −20° C., preferably at around −27° C., and the depalleting zone and the selective assembly zone are each at a temperature of over 0° C., preferably at +5° C.

6. The installation as set forth in claim 4 wherein temperature locks are disposed between the regions of different temperatures, preferably in the form of air curtains, wherein an increased pressure relative to the frozen areas prevails in the areas which are above the freezing point.

7. The installation as set forth in claim 4 wherein said storage tubs are of substantially parallelepipedic dimensions with the upwardly facing surface of the six surfaces thereof being open.

8. The installation as set forth in claim 4 wherein said storage tubs are provided with a machine-readable code.

9. The installation as set forth in claim 4 wherein the capacity of said storage tub is less than that of a full pallet which is packed in standard fashion.

10. The installation as set forth in claim 4 wherein said tub conveyor for the storage tubs travels at a speed of greater than 0.3 m/sec, preferably up to about 2.0 m/sec.

11. The installation as set forth in claim 4 wherein the selective assembly zone has a scale for weighing the storage tubs.

12. The installation as set forth in claim 4 wherein the selective assembly zone further comprises a display for displaying the number of items to be removed.

13. The installation as set forth in claim 4 further comprising at least one removal transport means for leading items taken from the storage tubs out of the selective assembly zone.

14. The installation as set forth in claim 13 further comprising an item sorter connected to said removal transport means.

* * * * *